United States Patent
Wang et al.

(10) Patent No.: US 10,147,024 B2
(45) Date of Patent: Dec. 4, 2018

(54) INTERFACING AN EVENT BASED SYSTEM WITH A FRAME BASED PROCESSING SYSTEM

(71) Applicant: QUALCOMM Incorporated, San Diego, CA (US)

(72) Inventors: Xin Wang, Shanghai (CN); William Howard Constable, San Diego, CA (US); Venkat Rangan, San Diego, CA (US); Manu Rastogi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 8 days.

(21) Appl. No.: 14/622,736

(22) Filed: Feb. 13, 2015

(65) Prior Publication Data

US 2016/0078321 A1    Mar. 17, 2016

Related U.S. Application Data

(60) Provisional application No. 62/051,145, filed on Sep. 16, 2014.

(51) Int. Cl.
| | |
|---|---|
| *G06K 9/00* | (2006.01) |
| *G06K 9/62* | (2006.01) |
| *G06K 9/20* | (2006.01) |
| *G06K 9/60* | (2006.01) |

(52) U.S. Cl.
CPC ....... *G06K 9/6267* (2013.01); *G06K 9/00624* (2013.01); *G06K 9/20* (2013.01); *G06K 9/605* (2013.01)

(58) Field of Classification Search
CPC .... H04N 5/232; H04N 5/341; G09G 2370/20; G06T 2200/28; G06K 9/4623
See application file for complete search history.

(56) References Cited

U.S. PATENT DOCUMENTS

| | | | |
|---|---|---|---|
| 7,426,301 B2 | 9/2008 | Porikli | |
| 8,200,595 B1 | 6/2012 | De Zilwa et al. | |
| 2009/0319560 A1 | 12/2009 | Cheng et al. | |
| 2010/0182468 A1* | 7/2010 | Posch | H04N 3/155 348/294 |
| 2011/0243376 A1 | 10/2011 | Lueke et al. | |
| 2012/0106854 A1 | 5/2012 | Tang et al. | |

(Continued)

FOREIGN PATENT DOCUMENTS

EP    2574511 A1    4/2013

OTHER PUBLICATIONS

Benosman, R., "Vision Without Frames: A Semiotic Paradigm of Event Based Computer Vision", Biosemiotics, vol. 3, No. 1, Jan. 19, 2010 (Jan. 19, 2010), pp. 1-16, XP055225146, Dordrecht ISSN: 1875-1342, DOI: 10.1007/s12304-009-9071-3.

(Continued)

*Primary Examiner* — Vu Le
*Assistant Examiner* — Guillermo M Rivera-Martinez
(74) *Attorney, Agent, or Firm* — Seyfarth Shaw LLP

(57) ABSTRACT

A method of interfacing an event based processing system with a frame based processing system is presented. The method includes converting multiple events into a frame. The events may be generated from an event sensor. The method also includes inputting the frame into the frame based processing system.

23 Claims, 3 Drawing Sheets

(56) References Cited

U.S. PATENT DOCUMENTS

| | | | | |
|---|---|---|---|---|
| 2013/0085642 | A1* | 4/2013 | Dankers | B60T 8/172 |
| | | | | 701/48 |
| 2014/0085447 | A1* | 3/2014 | Lorach | A61N 1/0543 |
| | | | | 348/62 |
| 2014/0363049 | A1* | 12/2014 | Benosman | G06T 7/269 |
| | | | | 382/103 |
| 2017/0003121 | A1* | 1/2017 | Brandli | G01B 11/25 |
| 2017/0053407 | A1* | 2/2017 | Benosman | G06T 7/73 |

OTHER PUBLICATIONS

International Search Report and Written Opinion—PCT/US2015/046066—ISA/EPO—Nov. 18, 2015.

Juergen K., et al., "Ground Truth Evaluation for Event-Based Silicon Retina Stereo Data", 2013 IEEE Conference on Computer Vision and Pattern Recognition Workshops, IEEE, Jun. 23, 2013 (Jun. 23, 2013), pp. 649-656, XP032479955, DOI: 10.1109/CVPRW.2013.98 [retrieved on Sep. 11, 2013].

Lichtsteiner P., et al., "A 128128 120 dB 15 s Latency Asynchronous Temporal Contrast Vision Sensor", IEEE Journal of Solid-State Circuits, IEEE Service Center, Piscataway, NJ, USA, vol. 43, No. 2, Feb. 1, 2008 (Feb. 1, 2008), pp. 566-576, XP011200748, ISSN: 0018-9200, DOI: 10.1109/JSSC.2007.914337.

Teixeira T., et al., "Address-Event Imagers for Sensor Networks: Evaluation and Modeling", Information Processing in Sensor Networks, 2006, IPSN 2006, The Fifth International Conference on Nashville, TN, USA Apr. 19-21, 2006, Piscataway, NJ, USA, IEEE, Apr. 19, 2006 (Apr. 19, 2006), pp. 458-466, XP010931928, DOI: 10.1145/1127777.1127847 ISBN: 978-1-59593-334-8.

\* cited by examiner

INTERFACING AN EVENT BASED SYSTEM WITH A FRAME BASED PROCESSING SYSTEM

CROSS-REFERENCE TO RELATED APPLICATION

This application claims the benefit under 35 U.S.C. § 119(e) to U.S. Provisional Patent Application No. 62/051,145, entitled "INTERFACING AN EVENT BASED SYSTEM WITH A FRAME BASED PROCESSING SYSTEM," filed on Sep. 16, 2014, the disclosure of which is expressly incorporated by reference herein in its entirety.

BACKGROUND

Field

Certain aspects of the present disclosure generally relate to neural system engineering and, more particularly, to systems and methods for interfacing an event based system with a frame based processing system.

Background

An event-driven object detection system may use a sensor, such as a dynamic vision sensor (DVS), to detect moving objects, such as faces or cars. Furthermore, the event-driven object detection system may classify the detected objects in real time based on prior training. In some cases, it is desirable to interface an event based system with a frame based processing system to process the detected events.

SUMMARY

In one aspect of the present disclosure, a method for interfacing an event based processing system with a frame based processing system is disclosed. The method includes converting multiple events into a frame. In one configuration, the events are generated from an event sensor. The method also includes inputting the frame into the frame based processing system.

Another aspect of the present disclosure is directed to an apparatus including means for converting multiple events into a frame. In one configuration, the events are generated from an event sensor. The apparatus also includes means for inputting the frame into the frame based processing system.

In another aspect of the present disclosure, a computer program product for interfacing an event based processing system with a frame based processing system is disclosed. The computer program product has a non-transitory computer-readable medium with non-transitory program code recorded thereon. The program code is executed by a processor and includes program code to convert multiple events into a frame. In one configuration, the events are generated from an event sensor. The program code also includes program code to input the frame into the frame based processing system.

Another aspect of the present disclosure is directed to an apparatus for interfacing an event based processing system with a frame based processing system having a memory and one or more processors coupled to the memory. The processor(s) is configured to convert multiple events into a frame. In one configuration, the events are generated from an event sensor. The processor(s) is also configured to input the frame into the frame based processing system.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
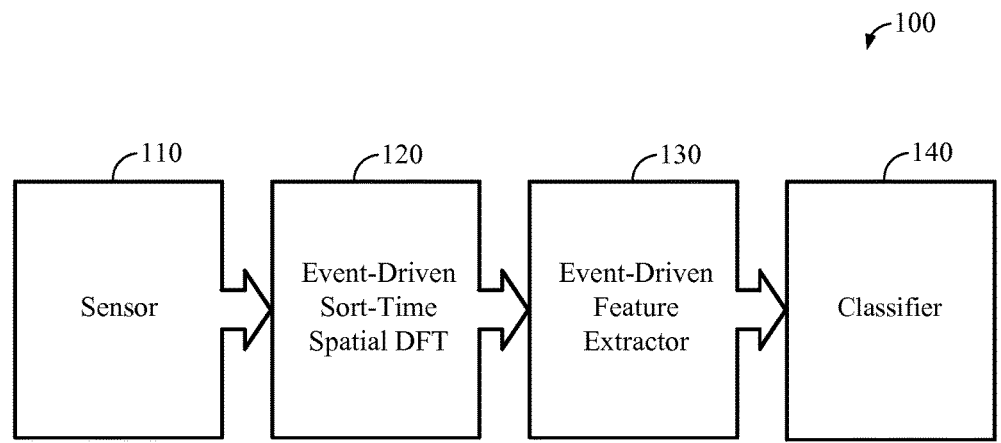
FIG. 1 illustrates an example of components of an event-driven object-detection system in accordance with certain aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Event-Driven Object Detection System

An event-driven object detection system may use a sensor, such as a dynamic vision sensor (DVS), to detect moving objects, such as faces or cars. Furthermore, the event-driven object detection system may classify the detected objects in real time based on prior training. The computations in the system may be triggered by sensor events. The event-driven object detection system may be referred to as the detection system.

According to aspects of the present disclosure, a detections system may process an image when an event is generated. That is, the detection system does not perform processing when events are not output from the sensor. Moreover, the processing load scales linearly with the sensor event rate.

The detection system 100 comprises various modules for processing data. As an example, as shown in FIG. 1, the detection system may include a sensor 110, such as a dynamic vision sensor, an event-driven sort time spatial discrete Fourier transformer (DFT) 120, an event-driven feature extractor 130, and a classifier 140.

In one configuration, the sensor 110 is configured to detect events. Specifically, the events may be generated from a change in intensity of a detected pixel. For example, the sensor 110 may be a DVS128 sensor from iniLabs. The sensor array may have a size of N×N (N=128) of which each pixel is a level-crossing sampler of log-luminance in time. The temporal resolution of the pixel is on the order of ten micro seconds. The output of the sensor may be a polarized, coordinate-addressed event train $\{(t_k; p_k; \mu_k; v_k)\}$, where $t_k$'s and $p_k$'s are time stamps and polarities of events and $(\mu_k; v_k)$ are the pixel coordinates of event $t_k$. Here $t_k \in R$, $p_k \in \{-1,1\}$ and $\mu_k, v_k \in \{1, \ldots, 128\}$.

The pixel response functions may be defined as:

$$x_{\mu,v}(t) = \Sigma_k P_k \delta_{\mu,\mu_k} \delta_{v,v_k} \delta(t-t_k), \quad (1)$$

where $(\mu, v) \in \{1, \ldots, 128\}^2$ index pixels. $\delta$ is the Kroenecker delta and $\delta(.)$ is the Dirac delta function. The matrix may also be written as:

$$X(t) = [x_{\mu,v}](t) \quad (2)$$

The event-driven spatial DFT (eSTsDFT) 120 receives an event train $\{(t_k; p_k; \mu_k; v_k)\}$ as an input and outputs a real-time complex N×N (N=128) matrix of spatial DFT:

$$\tilde{X}(t) = \int S_N X(T) S_N^T w(T-t) dT \quad (3)$$

Here $$S = \left[\frac{w_L^{mn}}{\sqrt{N}}\right] m, n = 0, \ldots, N-1 \quad (4)$$

$$= [s_N^0, \ldots, s_N^n, \ldots s_N^{N-1}]$$

$$= \frac{1}{\sqrt{N}} \begin{bmatrix} 1 & 1 & 1 & \cdots & 1 \\ 1 & w_N & w_N^2 & \cdots & w_N^{N-1} \\ 1 & w_N^2 & w_N^4 & \cdots & w_N^{2(N-1)} \\ \vdots & \vdots & \vdots & \ddots & \vdots \\ 1 & w_N^{N-1} & w_N^{2(N-1)} & \cdots & w_N^{(N-1)(N-1)} \end{bmatrix}$$

is the DFT matrix of N-th order, where $$w_N \triangleq e^{-\frac{2\pi i}{N}}$$

is the N-th root of unity and $$S_N^n \triangleq \frac{1}{\sqrt{N}} \begin{bmatrix} 1 \\ w_N^n \\ \vdots \\ w_N^{n(N-1)} \end{bmatrix}$$

is the (n+1)-th colum of $S_N$.

Furthermore, $w(-t) = \theta(t)\exp(-\omega_0 t)$ is an exponential short-time window function. The eSTsDFT 120 computes the value of $\tilde{X}(t)$ at each sensor event $\{t_k\}$.

The event-drive feature extractor (eFE) 130 reduces the dimensionality of the output of the eSTsDFT 120 from N×N×2 (N=128) to L=64 (i.e., from 128 complex numbers to 64 real numbers). Specifically, the L features are binned instantaneous spectral power of $\tilde{X}(t)$, $y(t) = \phi(\tilde{X}^*(t)\tilde{X}(t))$ where * is the conjugate transpose and $\phi(\ )$ is a log-linear transformation function, which is computed as follows.

$\tilde{X}^*\tilde{X}$ may be written as a 128×128 dimensional vector x and the linear function $\phi(\ )$, may be expressed as a matrix multiplication followed by a logarithm $y = \log(\phi x)$, where $$\Phi = \begin{bmatrix} \Phi_\rho \\ \Phi_\theta \end{bmatrix}$$

is a binary matrix of size 64×(128×128), which contains two components of size 32×(128×128), corresponding to 32 radial and 32 angular power bins. These matrices are constant valued and computed priorly, i.e., hand-crafted features.

The event-driven feature extractor 130 computes the value of y(t) at the end of every sensor event packet that contains on the order of 100 to 200 events.

The classifier 140, such as an event-driven support vector classifier (eSVM), computes a time-varying class label function z(t) based on the real-time feature vector y(t) extracted by the eFE 130, i.e., $z(t) = \psi(y(t))$, by virtue of a support vector machine with a Gaussian radial basis function (RBF) as kernels.

The classifier 140 computes the value of z(t) at the end of every sensor event packet that occurs at least $\Delta t_{min}$ since the last classification. As described below, TABLE 1 specifies mathematical description of the input/output objects to and from the modules/components of the system.

TABLE 1

| Module | Input | Output | Output dimensions | Update schedule |
|---|---|---|---|---|
| DVS | Visual scene | $X(t; \{(t_k, p_k, \mu_k, v_k)\})$ | 128 × 128 binary | |
| eSTsDFT | $X(t)$ | $\tilde{X}(t; \omega_0)$ | 128 × 128 complex | Every event |
| eFE | $\tilde{X}(t)$ | $y(t; \Phi)$ | 64 × 1 real | Every 100-200 events |
| eSVM | $y(t)$ | $z(t)$ | 1 × 1 categorical | Every 100-200 events separated by no less then 100 ms |

TABLES 2 and 3 provide the constant and state variables used for the event-driven short-time spatial DFT. TABLE 4 is pseudo-code for a single iteration of the detection system during which an event packet of length K is processed from the DVS.

TABLE 2

| Constant variable | Type | Dimension | Description |
|---|---|---|---|
| $\omega_0$ | real | 1 × 1 | Window function parameter (set to 10 Hz) |
| $S_{128}$ | complex | 128 × 128 | DFT matrix of order 128 |
| $\Phi$ | sparse binary | 64 × (128 × 128) | Feature matrix |
| $\Delta t_{min}$ | real | 1 × 1 | Minimum classification interval (set to 100 ms) |

TABLE 3

| State variable | Type | Dimension | Description |
|---|---|---|---|
| t | real | K × 1 | Event packet time stamp vector |
| p | -1, 1 | K × 1 | Event packet polarity vector |
| μ | 1, . . . 128 | K × 1 | Event packet horizontal coordinate vector |
| v | 1, . . . 128 | K × 1 | Event packet vertical coordinate vector |
| $\tilde{X}$ | complex | 128 × 128 | Short-time spatial DFT matrix |
| y | real | 64 × 1 | Feature vector |
| z | categorical | 1 × 1 | Class label |
| $t_{current}$ | real | 1 × 1 | Current event time |
| $t_{last}$ | real | 1 × 1 | Last event time |
| $t_{classify}$ | real | 1 × 1 | Last classification time |

TABLE 4

| Pseudocode | Comment |
|---|---|
| 1  fetch from DVS128 (t, p, μ, v) | Event packet of length K |
| 2  for k from 1 to K do | For each event |
| 3    $t_{current} \leftarrow t_c$ | Current event time |
| 4    $\tilde{X} \leftarrow p_k\left[s_M^{\mu_k-1} s_N^{v_k-1^T}\right] + e^{-\omega_0(t_{current}-t_{last})}\tilde{X}$ | Update $\tilde{X}$ |
| 5    $t_{last} \leftarrow t_{current}$ | Current event becomes last event |
| 6  end for | |
| 7  $y \leftarrow \varphi(\tilde{X}; \Phi)$ | Feature extraction |
| 8  if $t_{current} - t_{classify} > \Delta t$min do | If long enough since last classification |
| 9    $z \leftarrow \psi(y)$ | Classification |
| 10 end if | |

Interfacing an Event Based System with a Frame Based Processing System

As previously discussed, an event based processing system may use a sensor, such as a dynamic vision sensor (DVS), to detect moving objects, such as people or cars. For example, the sensor, such as the dynamic vision sensor, detects the change in luminance such that at least one event may be an indication that the luminance has changed at a particular location. Furthermore, the event-driven object detection system may classify the detected objects in real time based on prior training. Thus, the event based processing system may output one or more detected events. In the present application, events may be referred to as pixel events.

Furthermore, a frame based processing system classifies objects detected in a frame, such as a picture. A frame may be processed by a frame based processing system, such as a Support Vector Machine (SVM) classifier. In a conventional system, the events output by the event based object detection system may not be processed by a frame based processing system. The frame based processing system may be referred to as a frame based classifier.

Still, in some cases, a frame based processing system may be specified for an event based object detection system. Because the desired input of the frame based processing system may not be compatible with the output of the event based object detection system, an interface may be specified to convert event based outputs to a frame input. The converting of the events may be performed in real time as events are received or when a specific number of events have been received. The event based object detection system may be referred to as the event based system or the event based processing system.

In one configuration, a timing interface is specified to generate a frame by aggregating events received over a predetermined time. Furthermore, the aggregated events are input into the frame based classifier from the interface. The specific time period may be dynamically modified based on desired results and/or processing load. In another configuration, an event number interface is specified to generate a frame by aggregating a specific number of events into a frame. The specific number of events may be dynamically modified based on desired results and/or processing load.

Furthermore, in one configuration, the interface is dynamically selected. That is, the interface may dynamically switch between aggregating events for a specific time period into the frame and aggregating a specific number of events into the frame, and vice versa. The switching may be initiated based on desired results and/or processing load.

It should be noted that aspects of the present disclosure are not limited to image processing and may also be applied to other sensors, such as audio sensors. For example, audio frequencies or other audio characteristics may be detected by an event based object detection system and may be input to a frame based processing system or an equivalent type of processing system.

Additionally, or alternatively, in one configuration, a filter may be defined between the output of the event based object detection system and the input to the interface. The filter may be specified to filter (i.e., drop) specific events, such as events from specific areas that are not important, events from areas that produce an increased amount of noise, and/or events that satisfy other conditions. In one configuration, the downstream processing block determines that a number of events from a specific region have exceeded a threshold. Thus, the filtering of events to drop subsequent events from the specific region may be specified by the downstream processing block. The region may refer to a spatial area that produces events and/or a specific event generator, such as a specific vehicle that generates events.

It should be noted that the filter is not limited to filtering events that are visual and may also filter audio, temporal, or other events. For example, the filter may drop events occurring in a specific spectral frequency, such as an audio frequency, and/or the filter may drop events occurring at a specific time period. Additionally, events from a specific region or all events may be dropped when the processing load of the system exceeds a threshold and/or when another condition is satisfied.

For example, a specific area may have produced events that are greater than a threshold. Therefore, because the system has already received a specific number of events, the system may no longer desire to receive additional events from a specific region. Thus, the filter may be specified to filter events from specific regions. As another example, a downstream processing block, such as the frame based classifier, may desire to only classify events from one or more specific regions. Therefore, the filter may filter all or some events that are different from desired region(s).

Figure 2:
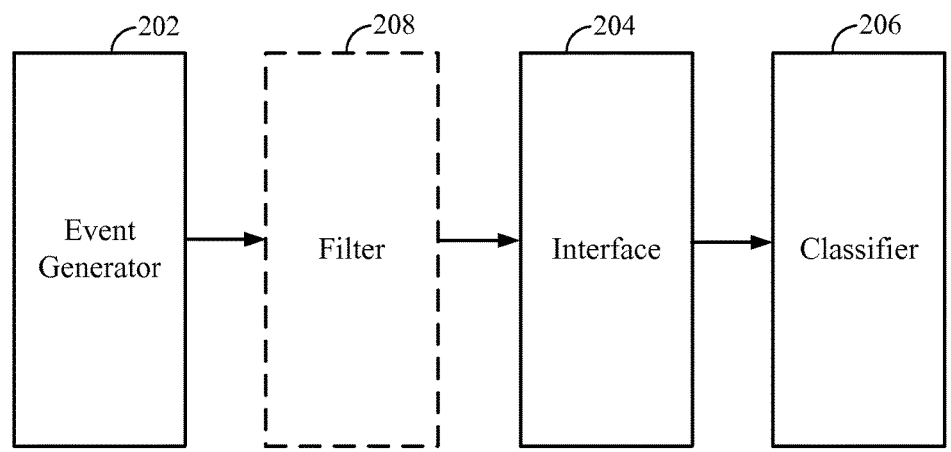
FIG. 2 illustrates an example of an interface between an event based processing system and a frame based processing system.

FIG. 2 illustrates an example of an interface according to an aspect of the present disclosure. As shown in FIG. 2, an event may be generated at an event generator 202. The event generator may be a sensor, such as a camera, or other device that processes events. For example, the events may be events generated from pixels received at a camera. Furthermore, the events are input to the interface 204. As previously discussed, the interface may dynamically select between a timing interface and an event number interface to generate a frame. Moreover, the generated frame is output to a classifier 206, such as frame based processing system. Additionally, as shown in FIG. 2, an optional filter 208 may be defined between the event generator 202 and the interface 204. As previously discussed, the filter 208 may be used to filter all events or specific events.

Figure 3:
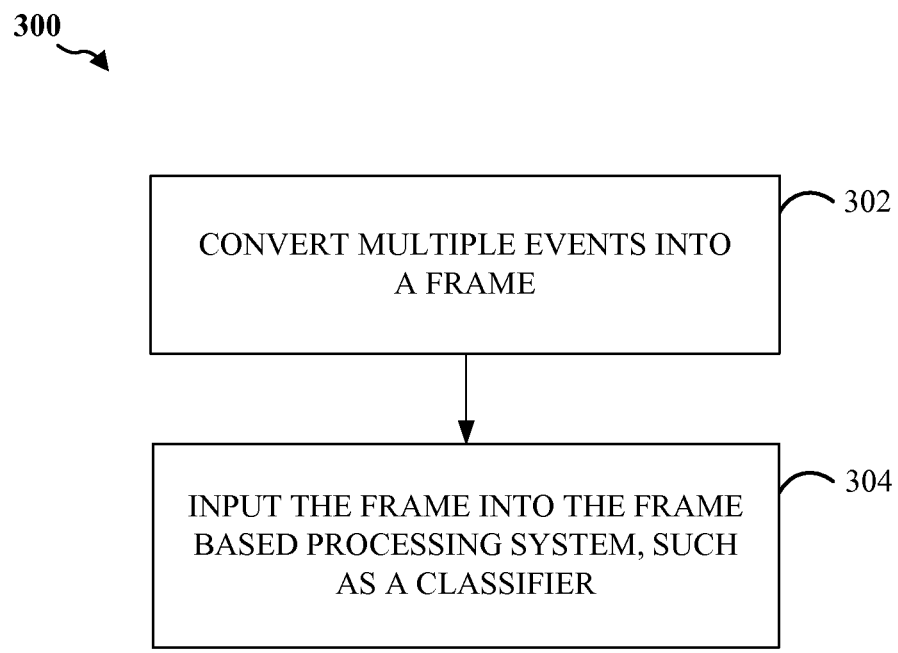
FIG. 3 is a flow diagram illustrating a method for interfacing an event based processing system with a frame based processing system in accordance with an aspect of the present disclosure.

FIG. 3 illustrates a flow diagram 300 for interfacing an event based system with a frame based processing system in accordance with aspects of the present disclosure. As show in FIG. 3, at block 302, the system converts multiple events into a frame. The events may be generated from an event sensor. Furthermore, at block 304, the system inputs the frame into the frame based processing system, such as a classifier.

Figure 4:
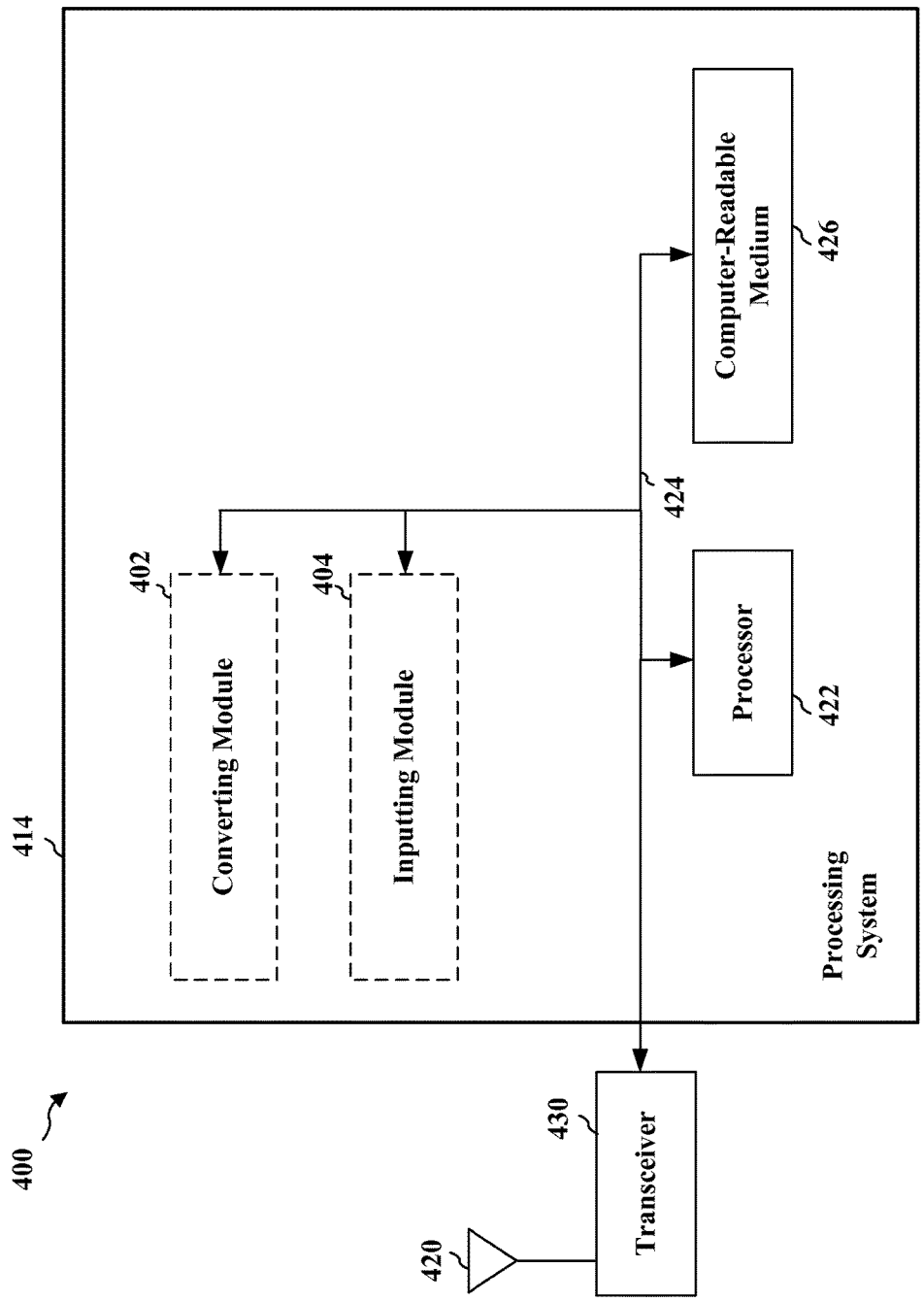
FIG. 4 is a block diagram illustrating different modules/means/components in an exemplary apparatus.

FIG. 4 is a diagram illustrating an example of a hardware implementation for an apparatus 400 employing a processing system 414 for interfacing an event based system with a frame based system. The processing system 414 may be implemented with a bus architecture, represented generally by the bus 424. The bus 424 may include any number of interconnecting buses and bridges depending on the specific application of the processing system 414 and the overall design constraints. The bus 424 links together various circuits including one or more processors and/or hardware modules, represented by the processor 422 the modules 402, 404, and the computer-readable medium 426. The bus 424 may also link various other circuits such as timing sources, peripherals, voltage regulators, and power management circuits, which are well known in the art, and therefore, will not be described any further.

The apparatus includes a processing system 414 coupled to a transceiver 430. The transceiver 430 is coupled to one or more antennas 420. The transceiver 430 enables communicating with various other apparatus over a transmission medium. The processing system 414 includes a processor 422 coupled to a computer-readable medium 426. The processor 422 is responsible for general processing, including the execution of software stored on the computer-readable medium 426. The software, when executed by the processor 422, causes the processing system 414 to perform the various functions described for any particular apparatus. The computer-readable medium 426 may also be used for storing data that is manipulated by the processor 422 when executing software.

The processing system 414 includes a converting module 402 for converting events, generated from an event sensor, into a frame. The processing system 414 also includes an inputting module 404 for inputting the frame into the frame based processing system. The modules may be software modules running in the processor 422, resident/stored in the computer-readable medium 426, one or more hardware modules coupled to the processor 422, or some combination thereof.

In one configuration, an interface 204 is configured for interfacing an event based processing system with a frame based processing system. The interface 204 may include means for converting and means for inputting. In one aspect, the converting means may be the converting module 402 configured to perform the functions recited by the converting means. The interface 204 is also configured to include a means for inputting. In one aspect, the inputting means may be the inputting module 404 configured to perform the functions recited by the inputting means. In another aspect, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method of interfacing an event based processing system with a frame based processing system, comprising:
    removing, at a filter that receives an event stream generated from an event sensor, an event from the event stream based on at least one of a spatial region of the event in a sensor array corresponding to pixels of the event sensor, a timing of the event in relation to a timing of another event of the event stream, or a combination thereof;
    aggregating a plurality of events received from the event stream output from the filter;
    converting the aggregated plurality of events into a frame that is compatible with the frame based processing system, which classifies a physical object represented by the aggregated plurality of events; and
    inputting the frame into the frame based processing system for classification of the physical object based on features extracted from the frame, the features corresponding to the aggregated plurality of events.

2. The method of claim 1, in which aggregating the plurality of events comprises aggregating the plurality of events for a specific time period.

3. The method of claim 2, further comprising dynamically modifying the specific time period based at least in part on desired results from converting the plurality of events into the frame, processing load, or a combination thereof.

4. The method of claim 1, in which aggregating the plurality of events comprises aggregating a specific number of events of the plurality of events.

5. The method of claim 4, further comprising dynamically modifying the specific number of events based at least in part on desired results from converting the plurality of events into the frame, processing load, or a combination thereof.

6. The method of claim 1, further comprising dynamically switching between a first interface for converting the plurality of events into the frame by aggregating events for a specific time period and a second interface for converting the plurality of events into the frame by aggregating a specific number of events.

7. The method of claim 1, in which at least one event of the plurality of events is an indication from a vision sensor that a luminance has changed at a particular location.

8. An apparatus for interfacing an event based processing system with a frame based processing system, the apparatus comprising:
    a memory unit; and
    at least one processor coupled to the memory unit, the at least one processor being configured:
        to remove, at a filter that receives an event stream generated from an event sensor, an event from the event stream based on at least one of a spatial region of the event in a sensor array corresponding to pixels of the event sensor, a timing of the event in relation to a timing of another event of the event stream, or a combination thereof;
        to aggregate a plurality of events received from the event stream output from the filter;
        to convert the aggregated plurality of events into a frame that is compatible with the frame based processing system, which classifies a physical object represented by the aggregated plurality of events; and
        to input the frame into the frame based processing system for classification of the physical object based on features extracted from the frame, the features corresponding to the aggregated plurality of events.

9. The apparatus of claim 8, in which the at least one processor is further configured to aggregate the plurality of events for a specific time period.

10. The apparatus of claim 9, in which the specific time period is dynamically modified based at least on desired results from converting the plurality of events into the frame, processing load, or a combination thereof.

11. The apparatus of claim 8, in which the at least one processor is further configured to aggregate a specific number of events of the plurality of events.

12. The apparatus of claim 11, in which the specific number of events is dynamically modified based at least on desired results from converting the plurality of events into the frame, processing load, or a combination thereof.

13. The apparatus of claim 8, in which the at least one processor is further configured to dynamically switch between a first interface for converting the plurality of events into the frame by aggregating events for a specific time period and a second interface for converting the plurality of events into the frame by aggregating a specific number of events.

14. The apparatus of claim 8, in which at least one event of the plurality of events is an indication from a vision sensor that a luminance has changed at a particular location.

15. An apparatus for interfacing an event based processing system with a frame based processing system, the apparatus comprising:
   means for filtering an event from an event stream, which is generated by an event sensor, based on at least one of a spatial region of the event in a sensor array corresponding to pixels of the event sensor, a timing of the event in relation to a timing of another event of the event stream, or a combination thereof;
   means for aggregating a plurality of events received from the event stream output from the means for filtering;
   means for converting the aggregated plurality of events into a frame that is compatible with the frame based processing system, which classifies a physical object represented by the aggregated plurality of events; and
   means for inputting the frame into the frame based processing system for classification of the physical object based on features extracted from the frame, the features corresponding to the aggregated plurality of events.

16. The apparatus of claim 15, in which the means for aggregating the plurality of events comprises means for aggregating the plurality of events for a specific time period.

17. The apparatus of claim 16, in which the specific time period is dynamically modified based at least on desired results from converting the plurality of events into the frame, processing load, or a combination thereof.

18. The apparatus of claim 15, in which the means for aggregating the plurality of events comprises means for aggregating a specific number of events of the plurality of events.

19. The apparatus of claim 18, in which the specific number of events is dynamically modified based at least on desired results from converting the plurality of events into the frame, processing load, or a combination thereof.

20. The apparatus of claim 15, further comprising means for dynamically switching between a first interface for converting the plurality of events into the frame by aggregating events for a specific time period and a second interface for converting the plurality of events into the frame by aggregating a specific number of events.

21. The apparatus of claim 15, in which at least one event of the plurality of events is an indication from a vision sensor that a luminance has changed at a particular location.

22. A non-transitory computer-readable medium having program code recorded thereon for interfacing an event based processing system with a frame based processing system, the program code being executed by a processor and comprising:
   program code to remove, at a filter that receives an event stream generated from an event sensor, an event from the event stream based on at least one of a spatial region of the event in a sensor array corresponding to pixels of the event sensor, a timing of the event in relation to a timing of another event of the event stream, or a combination thereof;
   program code to aggregate a plurality of events received from the event stream output from the filter;
   program code to convert the aggregated plurality of events into a frame that is compatible with the frame based processing system, which classifies a physical object represented by the aggregated plurality of events; and
   program code to input the frame into the frame based processing system for classification of the physical object based on features extracted from the frame, the features corresponding to the aggregated plurality of events.

23. The method of claim 1, in which removing the event based on the spatial region of the event comprises removing the event when a number of events at the spatial region of the event is greater than a threshold.

* * * * *